Aug. 13, 1929.  T. A. WILSON  1,724,689

DRIP CATCHER FOR PITCHERS AND THE LIKE

Filed Oct. 19, 1927

INVENTOR
Theresa A. Wilson
BY
ATTORNEY

Patented Aug. 13, 1929.

1,724,689

UNITED STATES PATENT OFFICE.

THERESA A. WILSON, OF BOONTON, NEW JERSEY.

DRIP CATCHER FOR PITCHERS AND THE LIKE.

Application filed October 19, 1927. Serial No. 227,132.

The device, the subject of this invention, is intended as a means for catching and retaining the drip from cream pitchers, sirup jugs and the like, and the object of the invention is to provide a device that may be formed integral with or secured to any container from which siccative or thick fluids are to be poured.

An object of the invention is to so construct the device that the drip will be retained and will not itself drip away from the container.

With these ideas in mind, the following is what I consider the best means of carrying out my invention, and the accompanying drawing should be referred to for complete understanding of the specification which follows:

In the drawing:—

Similar reference numerals indicate like parts in all the figures where they appear.

Figure 1:
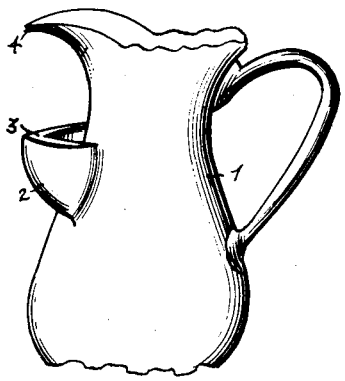
Figure 1 is the side elevation of a pitcher having a drip catcher formed integral therewith.

In Figure 1, and at 1, I show a cream pitcher and at 2 a projection formed integral therewith, the projection being a cup or scoped shaped article, and is provided with an inturned lip 3.

Drip from the pouring lip 4 of the pitcher adhering to the side of the pitcher will be in the cup 2, and when the pitcher is again used the lip 3 will prevent the drip from exuding from the cup 2.

Figure 2:
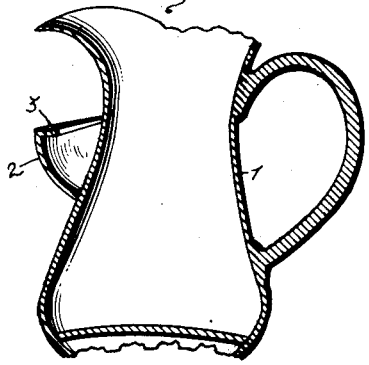
Figure 2 is a sectional view of the device shown in Figure 1.
Figure 4:
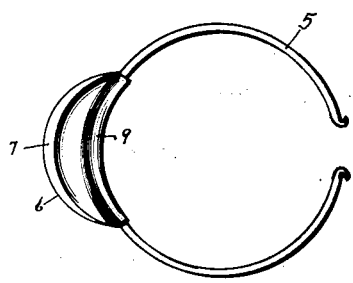
Figure 4 is a top plan view device shown in Figure 3.
Figure 3:
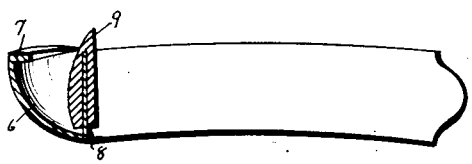
Figure 3 is a sectional view of a clamp-on device.

While the device shown in Figures 1 and 2 formed integral with the pitcher, I realize that there are many pitchers in use, that it would be a hardship to discard, and therefore I have constructed a device that may be attached to any pitcher or pouring container. Such a device consists of a resilient metallic member 5 to snap on the body of the pitcher or the container, and formed integral with or secured to a member 5, is a cup shaped member 6 having inwardly turned lip 7. As shown in Figure 3, the cup is formed independently of the band member 5, these parts being joined as indicated at 8. At 9 I show a rubber member formed in V shape, and adapted to be placed over the junction of the band 5, and the cup 9. This rubber member will engage closely the surface of the container upon which the band is engaged, and as the inner side of the rubber member is straight, the drip will be caught by the rubber member and directed into the cup 6.

It will be understood that the size and the location of the drip cups may be changed at will, and that other modifications may be made within the scope of the appended claim without departing from the principle or sacrificing the advantages of this invention.

Having carefully described my invention, what I claim and desire to secure by Letters Patent is:—

A drip cup for containers, a resilient member for temporarily securing the drip cup to said container and a compressible member between said drip cup and said container to close the joint between the edge of said cup and said container, and to direct the drip into said cup.

THERESA A. WILSON.